United States Patent
Dunaud et al.

(10) Patent No.: US 11,247,416 B2
(45) Date of Patent: Feb. 15, 2022

(54) METHOD FOR MANUFACTURING A TURBOMACHINE COMPOSITE PART

(71) Applicant: SAFRAN, Paris (FR)

(72) Inventors: Sébastien Dunaud, Moissy-Cramayel (FR); Dominique Marie Christian Coupe, Moissy-Cramayel (FR); Olivier Foussard, Moissy-Cramayel (FR); Didier Payen, Moissy-Cramayel (FR); Adrien Touze, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/270,778

(22) PCT Filed: Aug. 23, 2019

(86) PCT No.: PCT/FR2019/051953
§ 371 (c)(1),
(2) Date: Feb. 23, 2021

(87) PCT Pub. No.: WO2020/043980
PCT Pub. Date: Mar. 5, 2020

(65) Prior Publication Data
US 2021/0339485 A1 Nov. 4, 2021

(30) Foreign Application Priority Data

Aug. 29, 2018 (FR) ...................................... 1857773

(51) Int. Cl.
*B29C 70/48* (2006.01)
*F01D 5/28* (2006.01)
(Continued)

(52) U.S. Cl.
CPC .......... *B29C 70/48* (2013.01); *B29C 37/0092* (2013.01); *B29C 70/24* (2013.01);
(Continued)

(58) Field of Classification Search
CPC ....... B29C 70/48; B29C 70/543; B29C 70/24; B29C 37/0092; B29C 45/0005
See application file for complete search history.

(56) References Cited

U.S. PATENT DOCUMENTS

| 5,279,892 A * | 1/1994 | Baldwin | B29D 99/0025 |
| | | | 442/206 |
| 8,105,042 B2 * | 1/2012 | Parkin | B29C 70/088 |
| | | | 416/223 R |

(Continued)

FOREIGN PATENT DOCUMENTS

EP 1526285 A1 10/2004
FR 3062659 A 2/2017
(Continued)

OTHER PUBLICATIONS

International Search Report dated Dec. 13, 2019, issued in corresponding International Application No. PCT/FR2019/051953, filed Aug. 23, 2019, 6 pages.

*Primary Examiner* — Scott W Dodds
(74) *Attorney, Agent, or Firm* — Christensen O'Connor Johnson Kindness PLLC (57) ABSTRACT

Methods for manufacturing a turbomachine composite part, such as a fan blade, are provided. The composite part has a fibrous structure with a three-dimensional fibrous preform coated with a surface fibrous web, and which is embedded in a polymer matrix The methods include: forming the surface web in a cavity of a mold in order to shape it, wetting and forming the preform on the surface web in order to shape it, and closing the mold, drying the fibrous structure, and injecting thermosetting resin into the mold in order to form said polymer matrix. The surface web is wetted before and/or during the forming thereof.

15 Claims, 6 Drawing Sheets

(51) Int. Cl.
  *B29C 70/24* (2006.01)
  *B29C 70/54* (2006.01)
  *B29C 37/00* (2006.01)
  *B29D 99/00* (2010.01)
  *B29L 31/08* (2006.01)

(52) U.S. Cl.
  CPC .......... *B29C 70/543* (2013.01); *B29C 70/545* (2013.01); *B29D 99/0025* (2013.01); *F01D 5/282* (2013.01); *B29L 2031/08* (2013.01); *F05D 2220/36* (2013.01); *F05D 2230/20* (2013.01); *F05D 2300/6012* (2013.01); *F05D 2300/6034* (2013.01)

(56) References Cited

U.S. PATENT DOCUMENTS

| | | | |
|---|---|---|---|
| 2007/0092379 A1* | 4/2007 | Coupe | B29C 70/24 416/241 R |
| 2017/0232691 A1 | 8/2017 | Markowski | |
| 2018/0163745 A1* | 6/2018 | Ursenbach | B29D 99/0025 |

FOREIGN PATENT DOCUMENTS

| | | |
|---|---|---|
| WO | 20110098734 A1 | 8/2011 |
| WO | 20130088037 A2 | 6/2013 |
| WO | 20150049474 A1 | 4/2015 |

\* cited by examiner

METHOD FOR MANUFACTURING A TURBOMACHINE COMPOSITE PART

TECHNICAL FIELD

The present invention relates to the field of manufacturing a turbomachine composite part such as a fan blade.

BACKGROUND

The prior art comprises in particular the documents EP-A1-1 526 285, WO-A2-2013/088037, WO-A1-2015/049474, US-A1-2017/232691, WO-A1-2011/098734 and FR-A1-3 062 659.

It is known to manufacture parts of a turbomachine from composite material comprising a fibrous reinforcement structure embedded in a polymer matrix. The structure comprises a fibrous preform obtained by 3D weaving through a loom of the Jacquard type. The loom allows manufacturing of a three-dimensional (3D) preform by multilayer weaving between a plurality of layers of warp yarns and a plurality of layers of weft yarns. The yarns are for example carbon yarns.

The preform is usually flat, i.e. the preform coming out of the loom has a generally flat shape, although the thickness of the preform can vary.

The preform must then be shaped to a general shape close to that of the part to be manufactured. This shaping is carried out manually on a counter-shape, which is generally the cavity of the mold that will be used to make the composite part by injecting thermosetting resin.

During this shaping step, called forming, the preform is deformed and trimmed, in order to move the fibers according to the specifications of the finished part. To do so, the preform integrates tracers (glass wires) whose final theoretical position is projected onto the cavity. The operator therefore moves and positions each zone of the preform according to the projection of these markers. The challenge of the forming is that this shaping is done as naturally as possible without altering the weaving pattern on the surface and in the heart of the preform. It is important that the fibers are malleable to perform these manipulations especially in the thickest zones of the preform. This operation requires to wet abundantly the preform because the wet fibers slide better between them once lubricated with water.

Once formed, the preform must be dried in order to evacuate the water that is not desired to be kept in the mold when injecting the resin. Indeed, the presence of water is a major drawback that could cause porosity in the injected part. In the current technique, the drying operation is carried out in an autoclave or oven.

For the injection stage, the mold in which the preform is installed is closed and then thermosetting resin is injected into the mold. The preform is impregnated with resin which will polymerize and generate a rigid composite part.

This rigid part, as-cast, has a particular surface state inherent to the composite reinforcement and its woven bonded embossing. This surface state is not always suitable for the aerodynamic functionalities of a turbomachine part, such as a fan blade. Solutions, such as the addition of a surface web, are being studied, in the hope of improving the surface finish of the injection stock without increasing the mass and thickness of the fibrous structure. A gain in terms of improving the levels of appearance of the first damage to the part is also possible.

This surface web is a dry, thin fabric (e.g. carbon fiber) that covers the preform before the resin is injected. The web is therefore impregnated with resin at the same time as the preform. However, the web is difficult to shape and position on the preform. Indeed, the dry fabric is very fragile and therefore very sensitive to deformations related to its handling: cropping, waviness, torn fibres, etc.

The present invention proposes a solution to this problem, which is simple, effective and cost effective.

DISCLOSURE OF THE INVENTION

The invention proposes a method for manufacturing a turbomachine composite part, such as a fan blade, this part comprising a fibrous structure which comprises a three-dimensional fibrous preform coated with a surface fibrous web, and which is embedded in a polymer matrix, the method comprising the steps of:
  forming the surface web in order to shape it,
  wetting and forming the preform in order to shape it, and
  closing the mold, drying the fibrous structure and injecting thermosetting resin into the mold in order to form said matrix,
  characterized in that the surface web is wetted before and/or during its forming which is carried out in a cavity of a mold, the forming of the preform being carried out directly on the surface web in the cavity of the mold.

To facilitate the manufacture of the web by weaving fibres, these fibres are coated with a substance which facilitates the sliding of the fibres between them. The handling of the web and its forming, without wetting, leads to unintentional movement of the fibers and to a damage of the web. The wetting of the preform allows to dilute the above-mentioned substance and to limit the slippage of the fibres between them, which has the advantage of limiting the risk of damage of the web during handling and forming. In addition, the drying of the web allows to dry the substance, which will harden and stiffen the web by securing the fibers together, which is advantageous especially if this drying takes place before the forming of the web.

The surface web consists of fibers such as carbon fibers. These can be:
  a Uni-Directional (UD) layer obtained by sewing together unidirectional fibers,
  a fabric obtained by weaving tapes, oriented for example in perpendicular directions,
  a fabric with two superimposed Uni-Directional (UD) layers sewn together, the fibres of the two layers being oriented in different directions, for example perpendicular,
  etc.

The method according to the invention may comprise one or more of the following characteristics, taken in isolation from each other or in combination with each other:
  the surface web is wetted and oven-dried before its forming,
  before its drying, the surface web is coated with a handling fabric, and the whole is covered with a vacuum bag and subjected to a partial vacuum during the drying,
  the handling fabric is used to position the dried surface web in the cavity of the mold,
  before its wetting, the surface web is immobilized on a support by an adhesive,
  the surface web is rewetted during its forming,
  the surface web is cut before its wetting, and/or after its wetting, and/or during its forming,
  the preform and the surface web are wetted with water and/or tackifier, and the cavity of the mold optionally being wetted with water and/or tackifier before the forming of the surface web, the mold is closed by attaching a counter mold, also comprising a cavity in which a further surface web is formed, the surface web is formed by woven tapes, or by two bidirectional layers superimposed and sewn together.

DESCRIPTION OF THE FIGURES

The invention will be better understood and other details, characteristics and advantages of the invention will appear more clearly when reading the following description made as a non-limitative example and with reference to the appended drawings in which.

DETAILED DESCRIPTION

Figure 1:
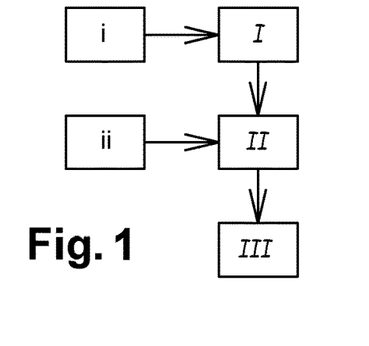
FIG. 1 is a block diagram illustrating steps of a method according to the invention.
Figure 4:
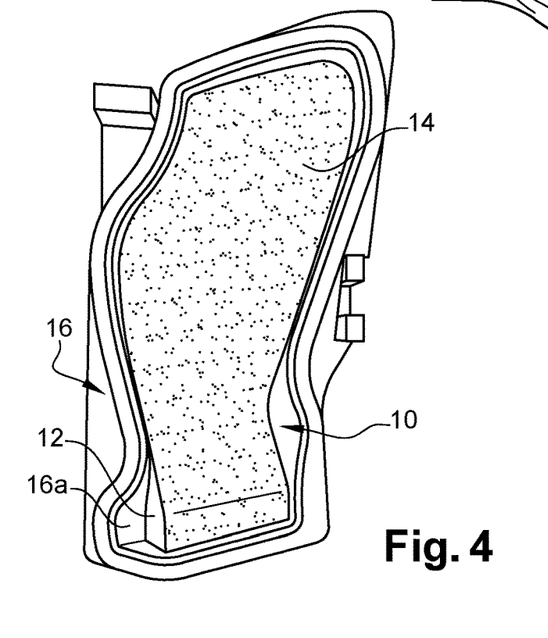
FIG. 4 is a schematic perspective view of a mold for manufacturing a composite part.

FIG. 1 is a block diagram illustrating the steps of a method according to the invention of manufacturing a turbomachine composite part 10 such as a fan blade visible in FIG. 4.

Figure 3:
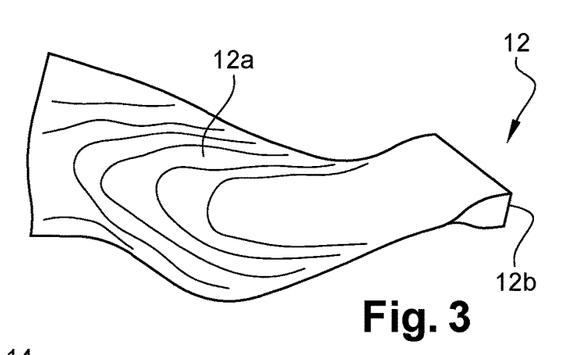

This part comprises a fibrous structure which comprises on the one hand a three-dimensional fibrous preform 12 visible in FIG. 3 and on the other hand at least one surface fibrous web 14 covering at least a portion of the preform. The fibrous structure is embedded in a thermosetting resin-based polymer matrix so as to obtain a rigid part.

Figure 2:
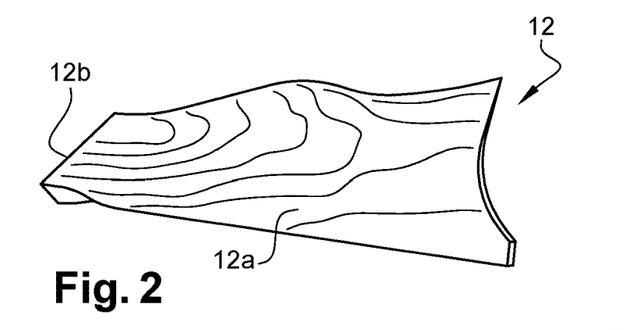
FIGS. 2 and 3 are schematic perspective views of a preform before and after forming.

As mentioned above, the preform 12 is produced by three-dimensional weaving of yarns using a loom, and has a generally flat shape visible in FIG. 2 at the exit of the loom. This fan blade preform 12 comprises a portion 12a intended to extend into the vane of the blade, and a portion 12b intended to extend into the blade root.

Figure 5A:
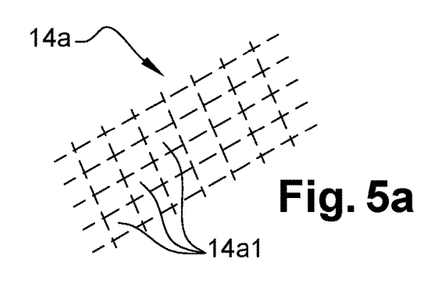
FIGS. 5a, 5b and 5c represent in a very schematic way different surface webs that can be used in the method according to the invention.
Figure 5B:
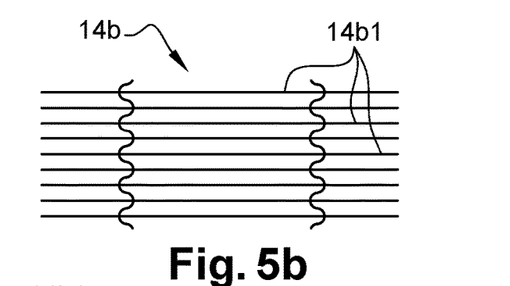
Figure 5C:
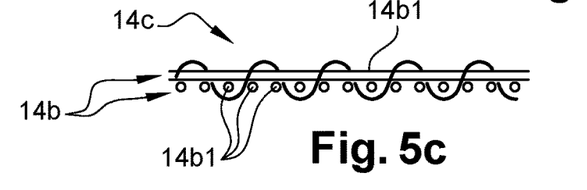

The surface web 14 comprises fibers such as carbon fibers and can be:

a fabric 14a visible in FIG. 5a, obtained by weaving tapes 14a1, oriented for example in perpendicular directions, a Uni-Directional (UD) layer 14b as shown in FIG. 5b, obtained by sewing unidirectional fibres 14b1 together, a fabric 14c comprising two Uni-Directional (UD) layers 14b superimposed and sewn together, the fibres 14b1 of the two layers 14b being oriented in different directions, for example perpendicular, etc.

The surface state of a preform 12 (FIGS. 2 and 3) is very irregular and a surface web 14 is generally deposited on both sides of the portion 12a, intended to be located respectively on the pressure and suction sides of the vane, to improve this surface state (FIG. 4). Each web 14 can extend to the portion 12b of the preform 12.

The method in FIG. 1 comprises steps of:
(I) forming the surface web 14,
(II) forming the preform 12, and
(III) injecting thermosetting resin into the fibrous structure formed by the web 14 and the preform 12.

Advantageously, the forming (I) of the surface web 14 is carried out by positioning the web in a cavity 16a of a mold 16 (FIG. 4) and deforming it to fit the shape of this cavity. This allows the web 14 to be shaped before the actual shaping of the preform 12 (II). The preform is also shaped by positioning the preform in the cavity 16a of the mold 16, directly on the web 14, and by deforming it to match the shape of the cavity.

The mold 16 is then closed by placing a counter mold on the mold, the fibrous structure is dried and the thermosetting resin is injected into the mold to impregnate the fibrous structure.

It is known to (ii) wet the preform 12 during its forming (II). To facilitate the handling of the web 14 and in particular to avoid its deterioration, the invention proposes to (i) also wet the web before and/or during its forming (I).

Figure 6:
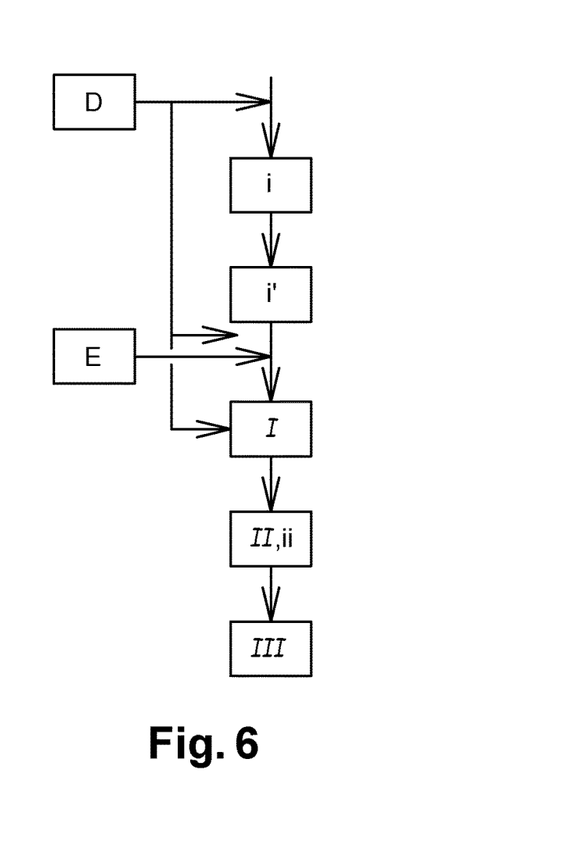
FIGS. 6 and 7 are block diagrams illustrating variants of embodiments of the method according to the invention.
Figure 7:
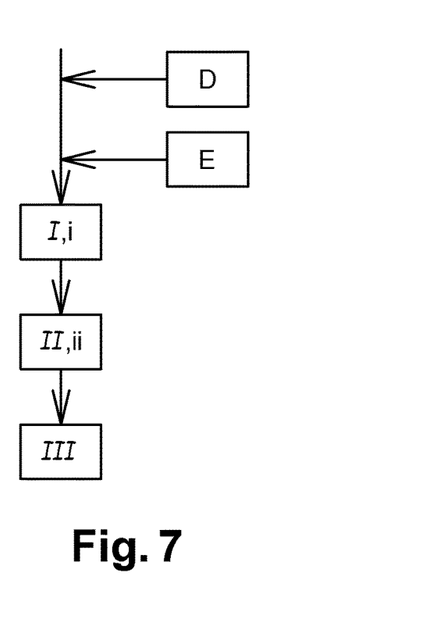

FIGS. 6 and 7 illustrate two variants of embodiment of the method.

The method of FIG. 6, which is also illustrated in FIGS. 8 to 26, uses a woven tape fabric 14a (FIG. 5a).

The method of FIG. 6 comprises a first step i, consisting in wetting the web 14a, here before its forming, which takes place in step I.

Figures 8, 9, 10:
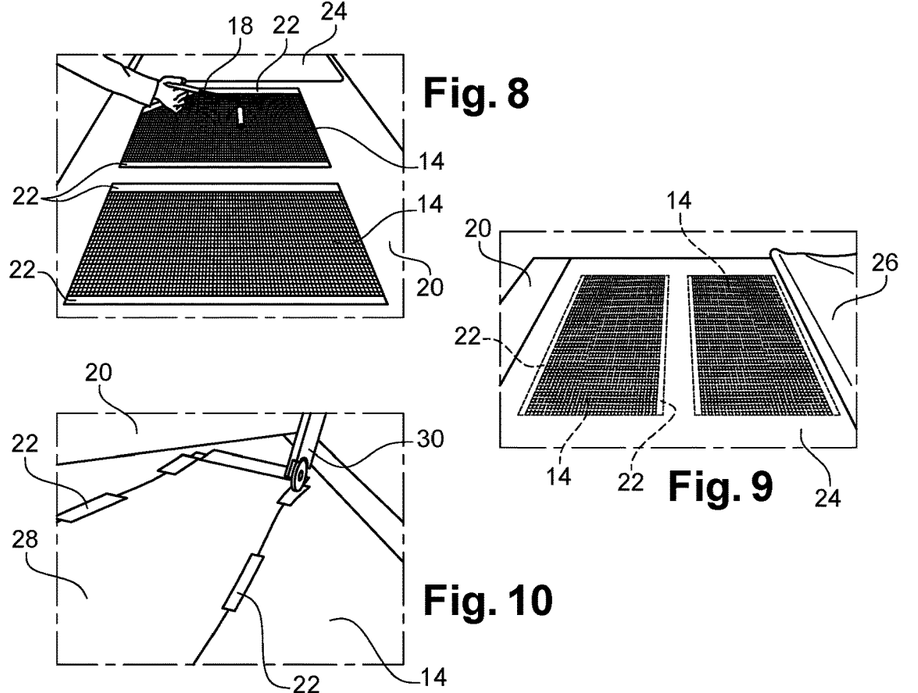
FIGS. 8 to 26 illustrate steps of the method of FIG. 6, and FIGS. 27 to 40 illustrate steps of the method of FIG. 7.

FIG. 8 illustrates this first step i during which an operator can spray, for example water, on the web 14 and in particular on each of the two webs 14 of the composite part to be manufactured. The spraying of the water is carried out using an appropriate tool 18.

Prior to this step i, the webs 14 can be pre-cut and can therefore undergo a cutting step D to set them at predetermined sides. In addition, the webs 14 can be immobilized on a support 20 such as the upper surface of a workbench, before the wetting. This immobilization can simply be achieved by using a strip adhesive 22 which is placed on two opposite sides of each web 14 for example.

The next step i' consists of drying the web 14 before shaping it. Drying gives the web an additional stiffness which makes it much less prone to deformation. For this purpose, and as shown in FIG. 9, the web 14 is covered with a handling fabric 24 which will facilitate the transfer of the web from the support 20 to the mold 16. The fabric 24 is advantageously made of a permeable material so that air and moisture can be sucked through it. The web 14 and the fabric 24 are then covered with a vacuum bag 26 which allows the web to be subjected to a partial vacuum. The whole is put in the oven and thus under partial vacuum, e.g. at a temperature of 110° C. or less, and for a sufficient time to obtain a dry web 14.

The step i' can be followed by a new step D of cutting the web 14, for example by means of a template 28 placed directly on the web, and possibly immobilized on the web by an strip adhesive 22 (FIG. 10). The cutting of the web can simultaneously lead to the cutting of the handling fabric 24 located here under the web. This cut D, as well as the previous cut, can be performed with any suitable tool, e.g. a pair of scissors, a knurl 30, a blade, etc.

Figure 11:
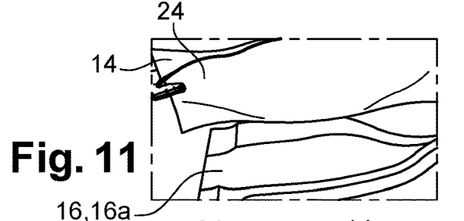
Figure 12:
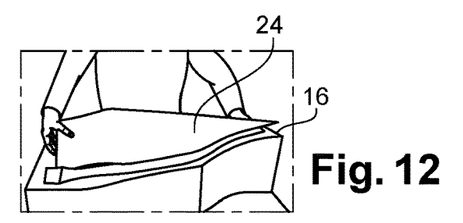
Figure 13:
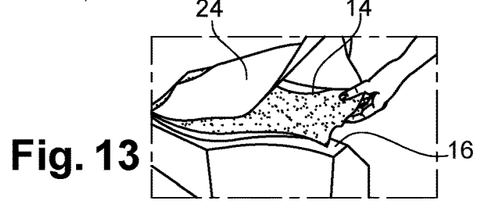
Figure 14:
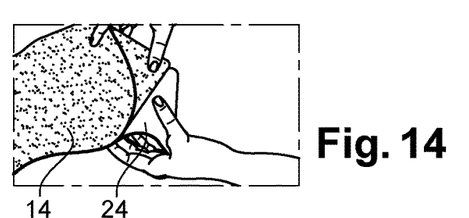
Figure 15:
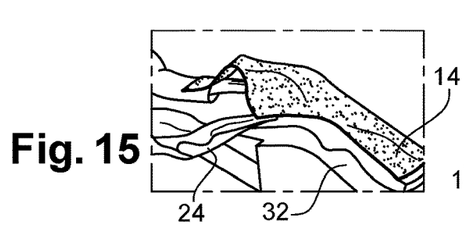
Figure 16:
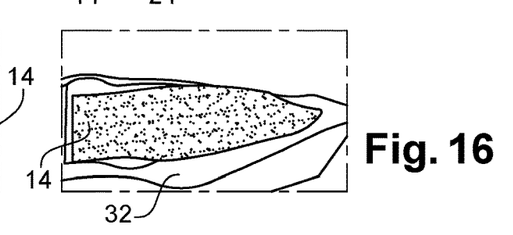

The next step shown in FIGS. 11 to 13 consists then to transfer the web 14 from the support 20 to the mold 16. Prior to this transfer, water may possibly be sprayed into the mold (step E in FIG. 6). The handling fabric 24 enables the web 14 to be grasped more easily without damaging it and facilitates its positioning in the cavity of the mold 16. Once the web is positioned, the fabric 24 is removed. The same operation is performed with the second web 14 which is positioned in the cavity of the counter mold 32, as shown in FIGS. 14 to 16.

Figure 17:
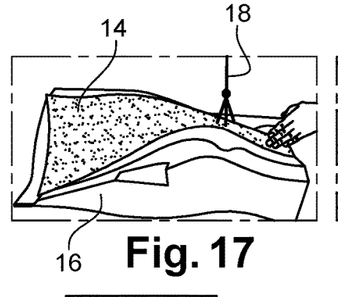
Figure 18:
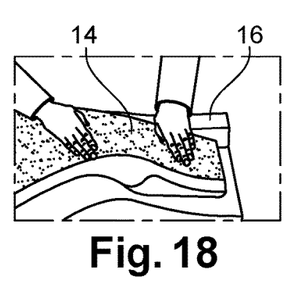
Figure 19:
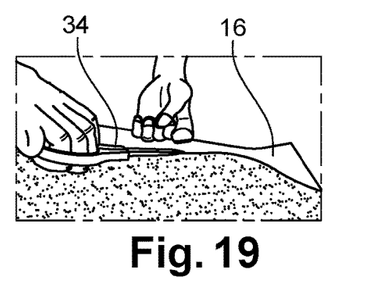
Figure 20:
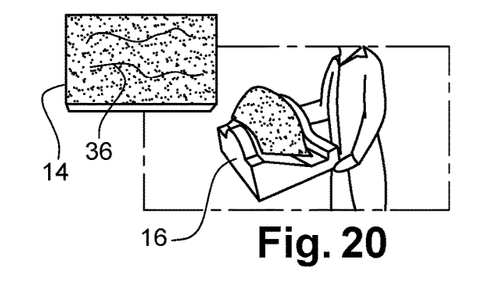
Figure 21:
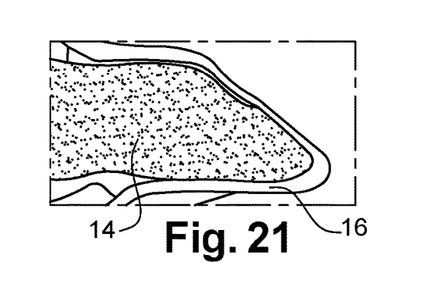

The next step I consists in shaping the web 14 in the cavity of the mold 16, preferably by wetting it again using the tool 18 to make it more flexible (FIG. 17). The shaping is carried out manually (FIG. 18) and may require an additional operation to cut the edges of the web, for example using a pair of scissors 34 (FIG. 19), to prevent the web from having bulges 36 (FIG. 20) and to ensure that it completely covers the bottom of the cavity of the mold 16 (FIG. 21). The same step I is carried out on the two webs 14, and thus on the mold 16 and the counter mold 24.

Figure 22:
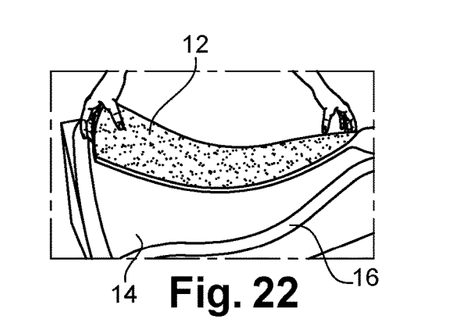
Figure 23:
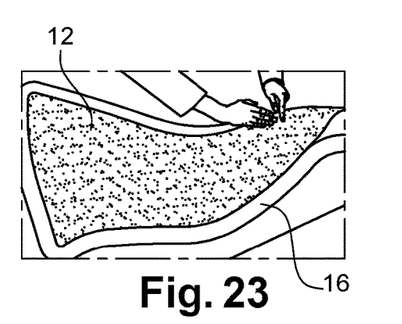
Figure 24:
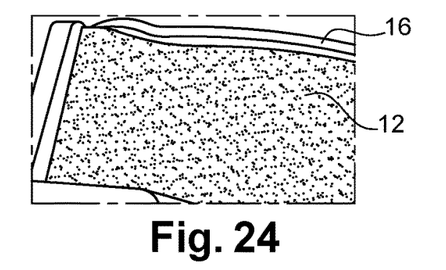
Figure 25:
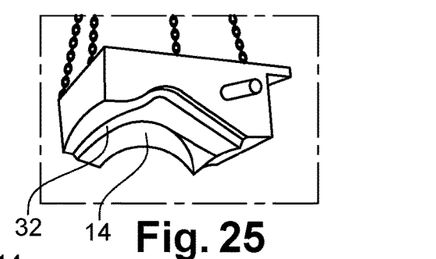
Figure 26:
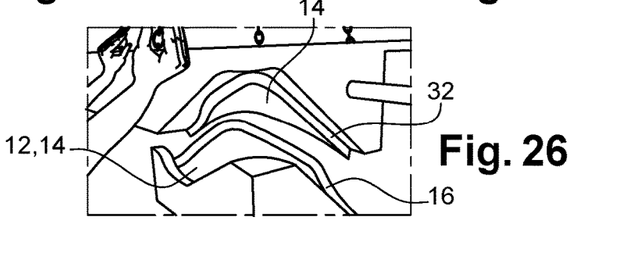

The next step II consists in shaping the preform 12 in the mold 16, directly on the previously installed web 14, by wetting it (step ii) also with water for example (FIG. 22). The shaping is carried out manually (FIG. 23) and ensures that the preform is wedged in the cavity and perfectly fits the shape of the cavity (FIG. 24).

The counter mold 32 is then added and fixed to the mold (FIGS. 25 and 26), which allows the second web 14 to be applied to the still bare face of the preform 12. The tooling thus assembled is then placed in an oven in order to be dried (for example by heating it to a temperature less than or equal to 120° C.) and before undergoing the resin injection operation (step III).

The method in FIG. 7, which is also illustrated in FIGS. 27 to 40, uses a fabric 14c with sewn layers (FIG. 5c).

Figure 27:
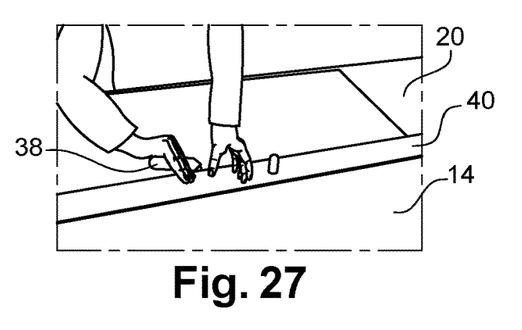
Figure 28:
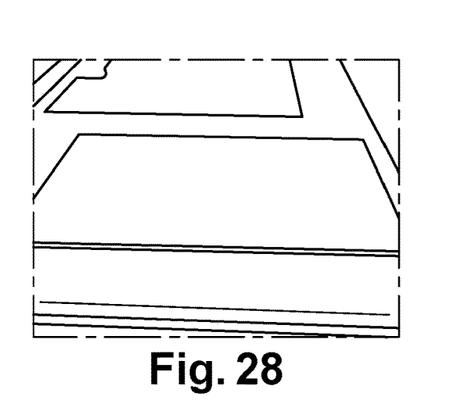

This fabric 14c has a better hold than the fabric 14a used in the previous embodiment and can be cut directly (without prior wetting and drying). For example, the cut D of the web 14 is made with a blade 38 of the cutter type and a ruler 40, on a support 20 (FIG. 27). The two webs 14 of the workpiece are thus cut (FIG. 28).

Figure 29:
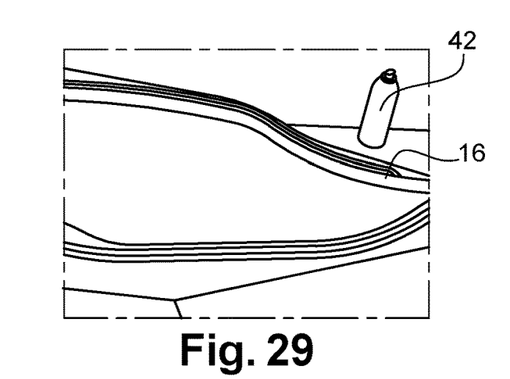
Figure 30:
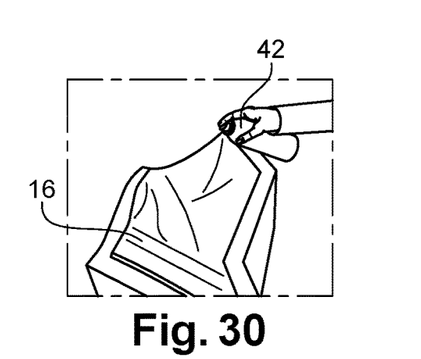
Figure 31:
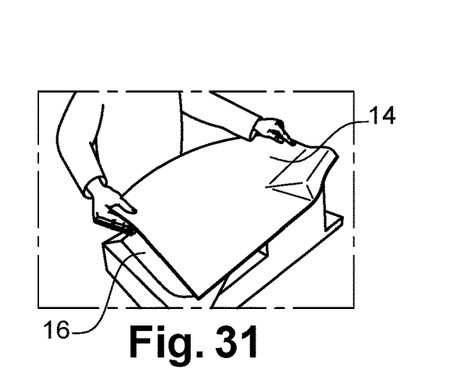
Figure 32:
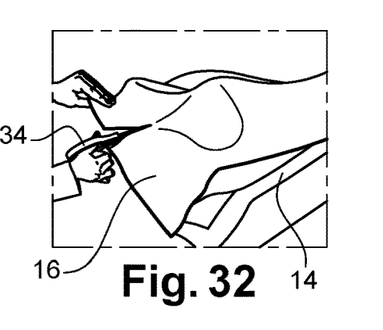

Prior to the transfer of the web 14 into the mold 16, water or a tackifier can optionally be sprayed into the mold 16 (step E in FIG. 7). For example, the tackifier is sprayed using a container 42 containing tackifier under pressure (FIGS. 29 and 30). A tackifier is a sticky substance, in this case for example water-based.

Figure 33:
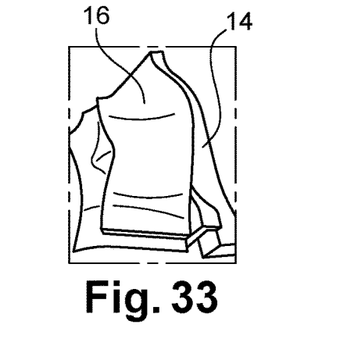
Figure 34:
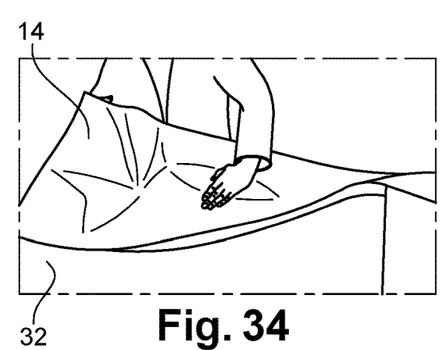
Figure 35:
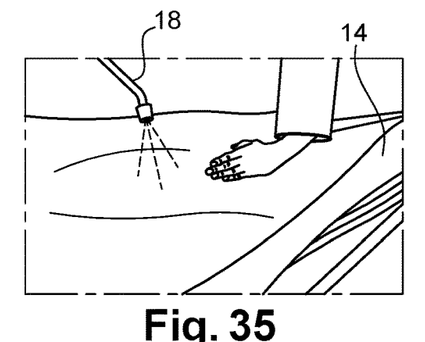
Figure 36:
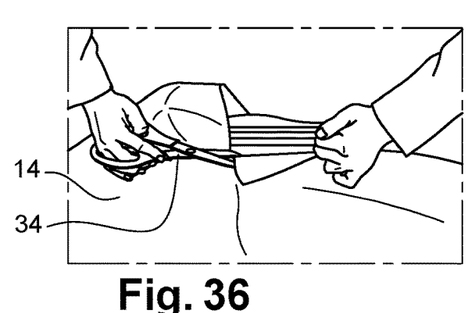
Figure 37:
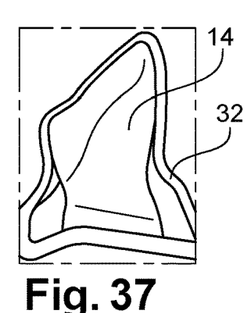

The next step shown in FIGS. 30 to 33 then consists in shaping (step I) a first web 14 in the cavity of the mold 16, optionally wetting it (step i) with the tool 18 to make it more flexible. This wetting may be optional if the prior wetting of the mold 16 is sufficient to wet and soften the web during its shaping. Shaping is carried out manually (FIGS. 30 and 31) and may require an additional operation to cut the edges of the web, for example using a pair of scissors 34 (FIG. 32), to ensure that the web completely covers the bottom of the cavity of the mold 16 (FIG. 33). Similar operations are carried out with the second web 14 in the counter mold 32, as shown in FIGS. 34 to 37.

Figure 38:
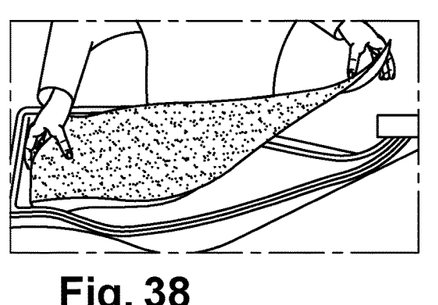
Figure 39:
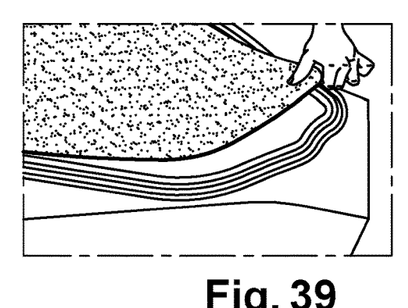
Figure 40:
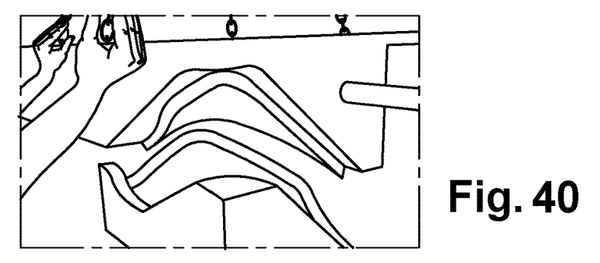

The next step II consists in shaping the preform 12 in the mold 16, directly on the previously installed web 14, by wetting it (step ii) also with the water or the tackifier, for example. The shaping is carried out manually and ensures that the preform is wedged in the cavity and perfectly fits the shape thereof (FIGS. 38 and 39).

The counter mold 32 is then added and fixed to the mold (FIG. 40), which allows the second web 14 to be applied to the still bare side of the preform 12. The tooling thus assembled is then placed in an oven in order to be dried (for example by heating it to a temperature less than or equal to 120° C.) and before undergoing the resin injection operation (step III).

The invention claimed is:

1. A method for manufacturing a turbomachine composite part comprising a fibrous structure which comprises a three-dimensional fibrous preform coated with at least one surface fibrous web, and which is embedded in a thermosetting resin-based matrix, the method comprising:
   wetting the at least one surface fibrous web;
   shaping the at least one surface fibrous web in a cavity of a mold;
   wetting and shaping the three-dimensional fibrous preform directly on the at least one surface fibrous web in the cavity of the mold, thereby forming the fibrous structure; and
   closing the mold, drying the fibrous structure, and injecting the thermosetting resin-based matrix into the mold thereby embedding the fibrous structure and forming the turbomachine composite part.

2. The method according to claim 1, further comprising oven-drying the at least one surface fibrous web after its wetting and before before its shaping.

3. The method according to claim 2, further comprising coating the at least one surface fibrous web with a handling fabric, covering the at least one surface fibrous web with a vacuum bag, and then, during the oven-drying, subjecting the at least surface fibrous web to a partial vacuum.

4. The method according to claim 3, further comprising using the handling fabric to position the at least one surface fibrous web in the cavity of the mold after its oven-drying.

5. The method according to claim 2, further comprising, before its wetting, immobilizing the at least one surface fibrous web on a support with an adhesive.

6. The method according to claim 2, further comprising rewetting the at least one surface fibrous web during its shaping.

7. The method according to claim 6, further comprising cutting the at least one surface fibrous web before its wetting.

8. The method according to claim 7, wherein the wetting of the three-dimensional fibrous preform and the wetting and rewetting of the at least one surface fibrous web are carried out with at least one of water or a tackifier.

9. The method according to claim 1, further comprising forming a further surface fibrous web in a second cavity of a counter mold and closing the mold by attaching the counter mold.

10. The method according to claim 1, wherein the at least one surface fibrous web is formed of woven tapes, or by two bidirectional layers superimposed and sewn together.

11. The method according to claim 6, further comprising cutting the at least one surface fibrous web after its wetting.

12. The method according to claim 6, further comprising cutting the at least one surface fibrous web during its shaping.

13. The method according to claim 7, further comprising further cutting the at least one surface fibrous web after its wetting.

14. The method according to claim 13, wherein the further cutting occurs during the shaping of the at least one surface fibrous web.

15. The method according to claim 8, further comprising wetting the cavity of the mold with at least one of water or the tackifier before shaping the at least one surface fibrous web.

* * * * *